1,738,847

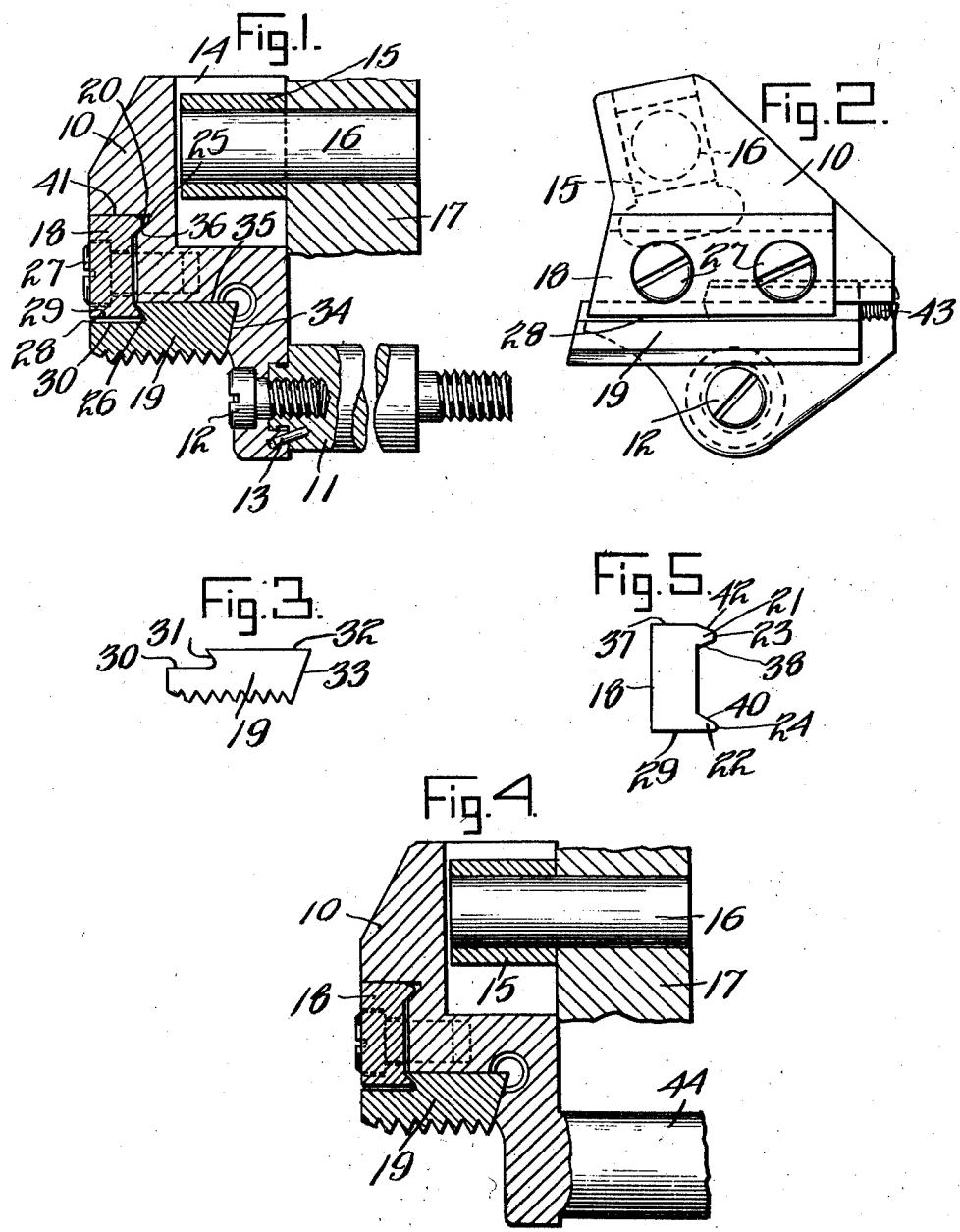
Dec. 10, 1929. H. T. SHEARER 1,738,847
CHASER AND CHASER HOLDER FOR DIE HEADS
Original Filed Sept. 30, 1925
Inventor
Harry T. Shearer Patented Dec. 10, 1929

UNITED STATES PATENT OFFICE

HARRY T. SHEARER, OF WAYNESBORO, PENNSYLVANIA, ASSIGNOR TO LANDIS MACHINE COMPANY, OF WAYNESBORO, PENNSYLVANIA, A CORPORATION

CHASER AND CHASER HOLDER FOR DIE HEADS

Original application filed September 30, 1925, Serial No. 59,563. Divided and this application filed February 17, 1928. Serial No. 255,148.

My invention relates to chasers and chaser holding devices for die heads for cutting the threads on pipes, rods, etc., as illustrated and described in my co-pending applications Nos. 59,563, filed September 30, 1925, and 67,136, filed November 5, 1925, which embody revolving and non-revolving thread cutting devices using the well known long-life tangential chasers of which first named application the present application is a division.

The objects of my invention are to secure a new and improved thread cutting chaser for cutting screw threads, a new and improved means for clamping the thread cutting chaser in its holder, a new and improved combination of chaser and clamp and holder wherein an accurate seating of the chaser is secured without the necessity of accurately finishing all surfaces on the chaser, clamp and holder.

Other objects will become apparent as the invention is described in the specification which follows.

Referring to the accompanying drawings which are made a part hereof and on which similar reference characters indicate similar parts, Figure 1 is a sectional view of a chaser holder and chaser, Figure 2, a plain view of the chaser holder and chaser shown in Fig. 1, Figure 3, an end view of the chaser used in Fig. 1, Figure 4, a sectional view of a modified form corresponding to Fig. 1 but having the fulcrum pin formed integrally therewith, and Figure 5, an end view of the clamp used in Figs. 1, 2 and 4.

In the drawings, Fig. 1, the number 10 denotes the chaser holder detachably mounted on the trunnion 11. The chaser holder is secured to the trunnion by a screw 12 having a head extending into a counter-bore in the chaser holder, the trunnion also having a part extending into such a bore. An inclined pin 13 extends through a small opening in the chaser holder and into the trunnion, said pin serving as a preliminary alining means for positioning the trunnion relatively to the chaser holder and holding the parts in place while the screw 12 is being tightened. The inclination of the pin prevents damage to the trunnion by the bulging or cracking of the metal between the pin and the adjacent periphery of the trunnion.

The chaser holder 10 is formed with a radial channel 14 adapted to receive a sliding block 15 carried on a pin 16 secured in a floating ring 17 which when turned changes the location of the cutting edges of the chasers to accommodate different sizes of work threaded, as more fully described in the above referred to applications.

The holder 10 is provided in the front face with suitable recesses for receiving a chaser clamp 18 and chaser 19. A groove 20 provides means for holding the clamp in position. This groove is similar to the well known constructions except that it has a squared or flat bottom instead of the V-shaped bottom. Cutting this groove is less destructive to cutting tools than cutting the V-shaped groove in the former constructions. As shown in Fig. 5, the clamp 18 has parallel depending edges 21 and 22 having the angular tip cut off so as to provide a dull point at 23 and 24 which are adapted when positioned within the holder to leave a clearance at 25 in the holder block and at 26 on the chaser. The clamp is secured in place by screws 27. When in position a clearance 28 is provided between the edge 29 of the clamp and the edge 30 of the chaser. The advantage of this clearance will later appear.

The chaser 19, shown in Figs. 1, 3 and 4, is substantially similar in its general outlines to chasers heretofore used, such for example as those shown in the patents to Fisher, 1,075,203; 1,142,411; 1,134,083 and 1,117,363. As a matter of actual practice, and as disclosed up to the present time, the surfaces at 30, 31, 32, and 33 on the chaser 19, surfaces 34, 35, 36 and 41 on the chaser holder 10, and the surfaces 29, 37, 38 and 40 of the chaser clamp 18 all had to be very accurately machined. It is understood, of course, that the thread serrations must be accurately machined. Inaccuracies in these surfaces or the lodging of small chips between contacting surfaces on the clamp, holder and chaser resulted in the tilting of the chaser which was detrimental when cutting screw threads as it changed the position of one chaser relative to the others, it being understood that the four chasers used on the head, as shown, must be so set as to follow one another at axial intervals corresponding to one-quarter of the pitch of the thread, at equal distances from the axis of the work being threaded and in planes parallel to each other.

It will be readily seen that the new and improved design disclosed in this application overcomes the tilting or moving of the chasers from their proper threading positions from causes such as inaccurate machining or the lodgment of dirt or chips between contacting surfaces as stated above. In the design disclosed in my application surfaces 32 and 33 on the chaser and surfaces 34 and 35 on the chaser holder are the only surfaces which have to be accurately machined.

As regards surface 31 on the chaser and its corresponding surface 40 on the clamp 18, surface 30 on the chaser, surface 29 on the clamp, surfaces 38 and 37 on the clamp, and the corresponding surfaces 36 and 41 on the holder may all be more or less inaccurate without tilting the chaser due to the space at 28 between surface 30 on the chaser and 29 on the clamp. The reason these inaccuracies can be tolerated is that owing to the space 28, a rocking movement of the clamp is permitted whereby the chaser will infallibly be seated against the faces 34 and 35 on the chaser holder due to the inclination of surfaces 38 on the clamp and 36 on the holder and surfaces 40 on the clamp and 31 on the chaser. The angular relation of these inclinations will draw the chaser up closely against the surfaces at 34 and 35 and it is absolutely vital for high class productive and accurate work that this be secured.

In the joining of surfaces 30 and 31 of the chaser a clearance or radiance is formed so that the joining point of the surfaces 40 and 29 on the clamp does not bind on the chaser, this joining point being also rounded off at 24 more or less. At the joining points of surfaces 36 and 41 of the chaser holder a relief is cut so that the joining point of surfaces 38 and 37 on the clamp does not bind on the chaser holder.

The clamp is preferably beveled at 42 and squared at 23 and the chaser holder has a square surface at 20 produced by a milling cutter. The space under the chaser clamp at this point permits dirt to escape instead of working in between faces 38 and 37 on the clamp and 36 and 41 on the chaser holder. A screw at 43 abutting against the end of the chaser serves to adjust the chaser in the direction of its length as usual.

The modification in Fig. 4 shows a chaser and chaser holder formed in the same way as those in Fig. 1, the chaser holder, however, having the trunnion 44 integral with the block 10.

One of the results secured by my invention is a chaser which may have the thread serrations ground after hardening. The usual practice is that the chasers are formed of such size as to permit of grinding on the necessary surfaces after hardening, so that when ground they will fit in the holding devices the same as unground chasers. In the Fisher design referred to above it is necessary to grind the four surfaces corresponding to 30, 31, 32, and 33 in addition to the serrations. The serrations have to be ground in relation to surface 33 in spaced relation of one quarter of the pitch. To do this and still maintain a length to surface 32 so that surface 31 will coincide with the corresponding surfaces on the clamp and secure a clamping action without a rocking of the clamp and consequently a displacement of the chaser from its correct threading position is practically an impossibility.

In the chaser herein disclosed in my application it is both practical and possible to grind chasers in the thread serrations and grind the clamping surfaces 33 and 32 and make possible the clamping of the chaser in its holder in correct cutting position, as the length of surface 32 can vary for the rocking of the clamp will take up the variation in the length of this surface without displacing the chaser from its proper cutting position.

The design disclosed in this application is a development made necessary in order to cut screws of the accuracy required by the National Screw Thread Commission standards, it not being possible with the older developments of this type chaser, clamp and holder to meet these requirements.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. In a die head, a chaser holder having recesses therein, a tangential chaser seated in one of the recesses, a clamp mounted on the holder having a rib for engaging the said chaser, and another rib engaging a groove formed as a part of the other of the recesses on the holder, a clearance being provided between the last named rib on the clamp and the bottom of the groove on the holder, substantially as set forth.

2. In combination a chaser holder and a chaser clamp for clamping a tangential chaser to the holder, the said clamp having a rib for engaging a recess on the back of a chaser and a rib engaging a groove formed in the holder, said groove and the rib engaging said groove being so formed as to provide a clearance between the rib and the bottom of the groove, substantially as set forth.

3. Means for supporting a tangential chaser in thread cutting position comprising a block having a recess on one side for receiving a chaser and a recess in an adjacent side for receiving a clamp, the said last named recess having a groove cut along one side, a clamp having depending ridges along parallel sides mounted in said recess, one of said ridges cooperating with the first named recess for holding a chaser and the other of the ridges engaging the groove and being cut off to provide a clearance between the ridge and the bottom of the groove, substantially as set forth.

4. In combination, a tangential chaser having a serrated front face, a rear face parallel to the front face, an inclined side face, a recess in the back with one side inclined oppositely to said side face, and a clamp having one depending edge in engagement with the inclined side only, a clearance being provided between a side face of the clamp and the adjacent back portion of the chaser, whereby the clamp may rock on its seat without affecting the position of the chaser, and a holder block for said chaser and clamp, substantially as set forth.

In witness whereof, I have hereunto set my hand at Waynesboro, Pennsylvania this 31st day of January, A. D. nineteen hundred and twenty-eight.

HARRY T. SHEARER.